United States Patent [19]

Buonpastore

[11] Patent Number: 5,207,811
[45] Date of Patent: May 4, 1993

[54] AIR FILTER SEALING GROOVE

[75] Inventor: Ernesto Buonpastore, Gastonia, N.C.

[73] Assignee: Dana Corporation, Toledo, Ohio

[21] Appl. No.: 910,415

[22] Filed: Jul. 8, 1992

[51] Int. Cl.$^5$ .............................. B01D 46/02
[52] U.S. Cl. ............................ 55/498; 55/502; 55/508
[58] Field of Search ............. 55/493, 494, 497, 498, 55/502, 508, 521

[56] References Cited

U.S. PATENT DOCUMENTS

| | | |
|---|---|---|
| 3,146,194 | 8/1964 | Hathaway . |
| 3,224,591 | 12/1965 | Sawyer . |
| 3,305,095 | 2/1967 | Hathaway . |
| 3,339,738 | 9/1967 | Wilhelm . |
| 3,353,680 | 11/1967 | Niebergall . |
| 3,508,383 | 4/1970 | Humbert, Jr. et al. . |
| 3,557,963 | 1/1971 | Offer . |
| 4,278,455 | 7/1981 | Nardi ................................ 55/502 X |
| 4,758,256 | 7/1988 | Machado ............................ 55/498 |
| 4,950,317 | 8/1990 | Dottermans ....................... 55/498 X |
| 5,022,001 | 6/1991 | Meunier ............................. 55/502 X |

*Primary Examiner*—Charles Hart
*Attorney, Agent, or Firm*—Marshall & Melhorn

[57] ABSTRACT

An air filter assembly comprises a filter housing having a filter media is mounted therein, and interposed between the inlet and outlet of the housing. An end cap having an annular groove formed therein is mounted to one end of the filter media. A gasket formed of a pliable material is mounted within the groove. The assembly is provided with means for urging the end cap against an adjacent end wall of the housing to compress the pliable gasket therebetween, thereby sealing the inlet from the outlet, and insuring that air passing through the outlet must first pass through the filter media of the filter unit.

17 Claims, 2 Drawing Sheets

AIR FILTER SEALING GROOVE

BACKGROUND OF THE INVENTION

1. Field of the Invention

The invention relates to air filters and, more particularly, to heavy duty air filters including a gasket mounted thereon to prevent the flow of unfiltered air about the filter.

2. Summary of Related Art

Air filters are well known devices wherein air is drawn or forced into a housing and caused to pass through a filter unit having a full flow filter media to remove the dirt and dust particles carried in the air. Substantially clean air is thereby passed to the point of usage, such as an internal combustion engine. Large, heavy duty air filters are utilized on heavy equipment, such as trucks and earth movers. Such air filters have heretofore generally included an annular foamed rubber gasket bonded to the substantially flat end cap of the filter unit with an adhesive. This gasket seals the inlet from the outlet of the housing, so that no air will pass through the outlet without first having passed through the filter unit. Typically, the gasket is compressed between the end cap of the filter unit and the end wall of the housing by the manual tightening of a bolt which urges the filter unit into sealing engagement against the end wall of the housing.

While the mounting of the foamed rubber gasket to the end cap by means of an adhesive is almost universally practiced, and has been for many years, this construction has a number of disadvantages, the significance of which were not heretofore appreciated. Thus, the gasket, which in air filters is generally formed of a foamed rubber material, tends to lose its stability and concentricity as the filter unit is forced against the housing end wall. Further, it is believed that users often overtighten the bolt, thereby subjecting the gasket to excessive compressive forces and potentially causing permanent deformation of the gasket. As a result, the integrity of the seal provided by the gasket is often compromised. Finally, the bonding of the gasket to the housing end cap makes it difficult if not impossible to remove and replace the gasket. Replaceability of the gasket is desirable if, for example, the filter unit is of the type which is cleaned and reused.

SUMMARY OF THE INVENTION

The present invention relates to an air filter assembly comprising a filter housing having opposing end walls and a side wall between the end walls. The housing has an air inlet and an air outlet formed therein. A filter media is mounted within the housing and is interposed between the inlet and outlet of the housing. An end cap is mounted to one end of the filter media, the end cap having an annular groove formed therein. A gasket formed of a resilient, pliable material is mounted within the groove. The assembly is provided with means for urging the end cap against an adjacent end wall of the housing to compress the pliable gasket therebetween, thereby sealing the inlet from the outlet so that no air can pass out of the outlet without having first passed through the filter media.

The novel construction of the present invention is advantageous in that the side walls of the groove protect the gasket from sliding and collapsing, ensuring the stability and concentricity of the gasket. Furthermore, the walls defining the groove serve to limit the amount of potentially damaging compressive force which may be applied to the gasket through the manual tightening of the bolt. As the gasket is retained with a groove, the need to use an adhesive to permanently bond the gasket to the end cap is eliminated, facilitating replacement of the gasket.

While somewhat similar grooves have been used in conjunction with the sealing gasket on spin-on oil filters for many years, there are many important distinctions between oil filters and air filters which presumably have not led others to employ a structure similar to the present invention on air filters. Such distinctions include the widely differing temperature and pressure conditions experienced by oil filters and air filters. Oil filters typically operate at much higher temperatures and pressures than do air filters. Thus, the gaskets for oil filters are generally formed of a rigid, relatively hard rubber material, while the gaskets for air filters are formed of a resilient, pliable foamed rubber material. Air filter gaskets are thus much more susceptible to deformation and loss of concentricity than are oil filter gaskets. In view of the different environments, the advantages of the present invention were not heretofore appreciated.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
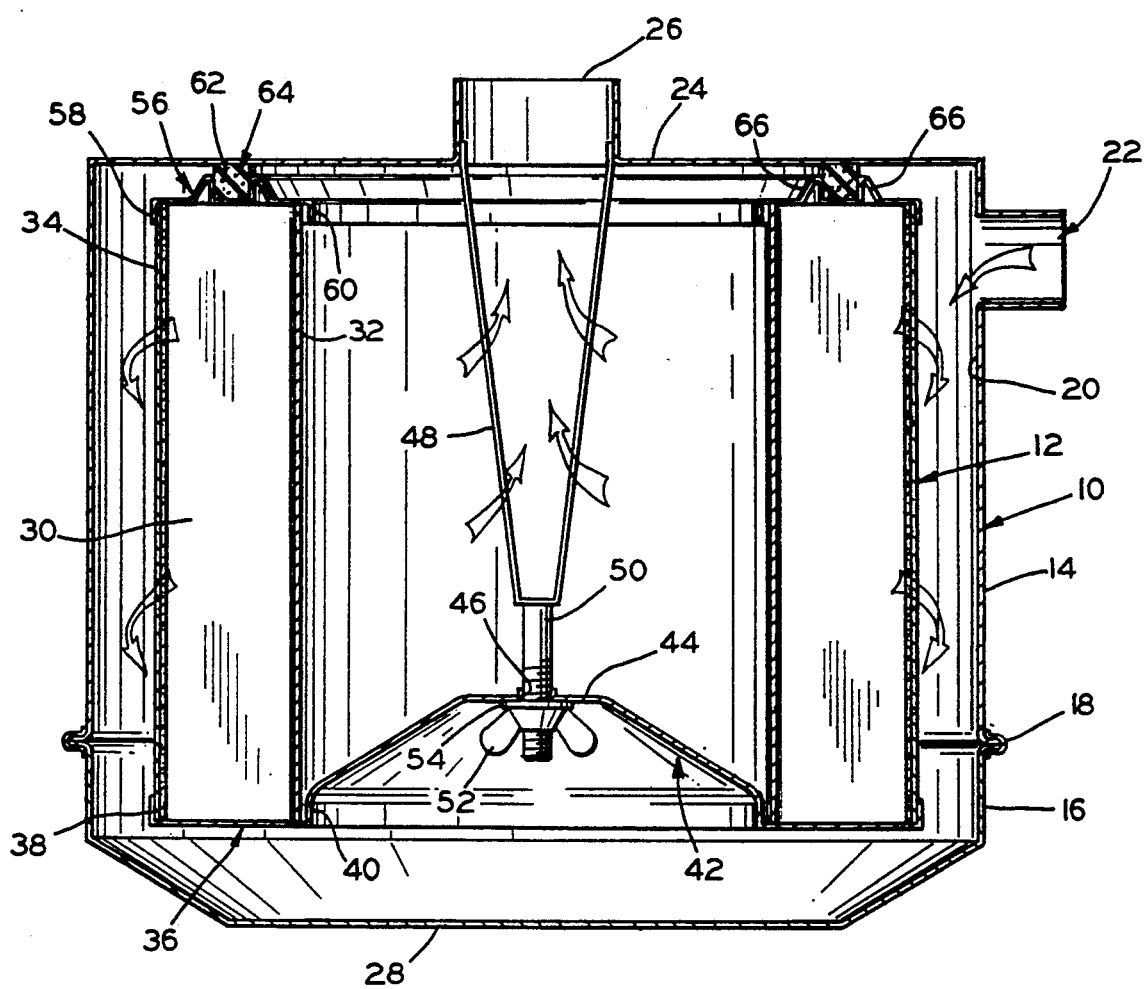
FIG. 1 is a longitudinal sectional view of the an air filter in accordance with the present invention.

Referring now to the drawings, there is illustrated in FIG. 1 an air filter assembly in accordance with the present invention including a housing generally designated 10 having a filter unit generally designated 12 mounted therein. The housing 10 is formed of an upper portion 14 and a lower portion 16 which are held together by any appropriate means, such as by a clamping ring 18. The side wall 20 of the upper portion 14 is provided with an inlet 22 near the top thereof, and the top or end wall 24 of the housing 10 is provided with an outlet 26. The bottom of the housing is closed by a bottom wall 28.

The filter unit 12 is comprised of a filter media 30 which is typically made of pleated paper which may or may not be treated with a moisture resistant material. The pleated paper filter media 30 is protected by inner tube 32 and outer tube 34, both formed of a foraminous material, such as perforated metal.

The filter unit 12 is further provided with an end cap 36, typically formed of a suitable metal, at the lower end thereof. The end cap 36 has an outer flange 38 which abuts the lower end of the outer tube 34 and an inner flange 40 which abuts the lower end of the inner tube 32 to retain the outer tube 34, inner tube 32 and filter media 30 in position. The inner portion of the end cap 36 extends upwardly and inwardly to form a dome-like structure 42 within the inner tube 32. This dome-like structure 42 is provided with a substantially flat center portion 44 having an opening 46 therein. A spider 48 is mounted at the outlet 26, extending downwardly and inwardly therefrom to fixedly engage the end of a bolt 50 which extends through the opening 46. The bolt 50 is provided with an associated wing nut 52 and sealing washer 54, with the washer 54 engaging the flat center portion 44 of the end cap 36 to retain the filter unit 12 in position within the housing 10.

Figure 2:
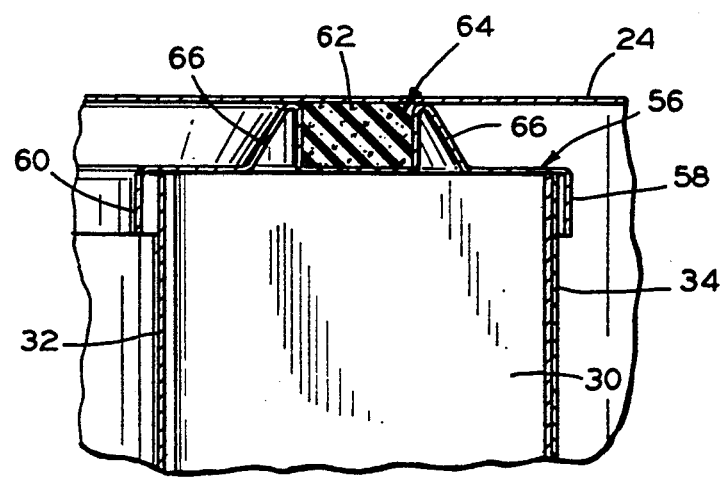
FIG. 2 is an enlarged view of a portion of the air filter of FIG. 1 after tightening.

As best seen in FIG. 2, the upper end of the filter unit 12 is likewise provided with an end cap 56, also typically formed of a suitable metal. The end cap 56 includes an outer flange 58 which abuts the upper end of the outer tube 34, and an inner flange 60 which abuts the upper end of the inner tube 32. The upper end cap 56 is sealed to the upper end of the pleated paper filter media 30 by any suitable means, such as by means of an adhesive.

A gasket 62 formed of a suitable pliable material, preferably foamed rubber, is mounted in a groove 64 formed in the end cap 56. The groove 64 is preferably formed by providing a pair of radially spaced annular projections 66 extending from the end cap 56 away from the filter media 30. The base of the groove 64 thus remains coplanar with the remainder of the end cap 56, abutting the end of the filter media 30. The end cap 56 may be formed on a stamping press from a single sheet of metal by employing various dies to form the end cap 56 and groove 64.

The gasket 62 is compressed between the end cap 56 of the filter unit 12 and the top wall 24 of the housing 10 by tightening the wing nut 52 on the bolt 50, which forces the filter unit 12 against the top wall 24 of the housing 10. The gasket 62 thus provides a seal between the upper end cap 56 and the end wall 24 of the housing 10, thereby sealing the inlet 22 to the housing 10 from the outlet 26 and insuring that air passing through the outlet 26 must first pass through the filter media 30 of the filter unit 12.

The projections 66 forming the groove 64 support the gasket 62 laterally and prevent it from sliding and collapsing upon tightening of the wing nut 52 on the bolt 50, thereby ensuring the stability of the gasket 62. Retaining the gasket 62 in the concentric groove 64 also virtually eliminates any loss of concentricity which would otherwise be experienced by the gasket 62 during use of the filter assembly.

When properly tightened, the gasket 62 is generally compressed from about 20 to 25 percent. However, overtightening is not uncommon, and potentially results in permanent deformation of the gasket 62. The tightening of the wing nut 52 on the bolt 50 urges the filter unit 12 towards the top wall 24 of the housing 10, compressing the gasket 62 between the end cap 56 of the filter unit 12 and the top wall 24 of the housing 10. The projections 66 forming the groove 64 serve to limit the amount of potentially damaging compressive force which may be applied to the gasket 62 through the manual tightening of the bolt 50. No additional compressive force is applied to the gasket 62 once the projections 66 contact the top wall 24 of the housing 10. Thus, the height of the projections 66 controls the extent to which the gasket 62 may, at a maximum, be compressed.

Furthermore, while FIG. 1 shows the air filter mounted vertically, in some applications the space available requires that the filter be mounted horizontally. In such applications, the weight of the filter unit 12 tends to cause the outer end of the unit to sag. With the prior art filter gaskets, this subjected the bottom portion of the gasket to additional compressive forces, while reducing the compressive force against the upper portion of the gasket to the point where the seal was not effective. User response was typically to further tighten the wing nut on the bolt, often resulting in failure of the gasket. With the present invention, the projections 66 contact the top wall 24, providing rigidity and preventing any gravity induced sagging of the filter unit 12 about the bolt 50, thereby eliminating the problems associated with mounting the prior art filters horizontally.

As the gasket 62 is retained within groove 64, the need for an adhesive to permanently bond the gasket 62 to the end cap 56 is eliminated, greatly enhancing the replaceability of the gasket 62. Preferably, a means is provided for retaining the gasket 62 within the groove 64.

Figure 3:
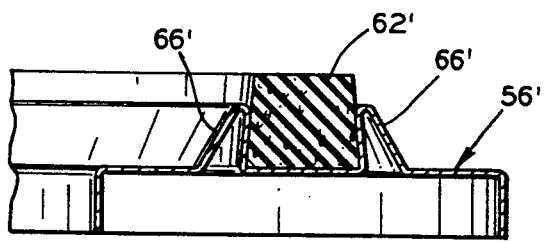
FIG. 3 is an enlarged sectional view of one embodiment of the housing end cap and gasket of the present invention.

In one embodiment of the invention, illustrated in FIG. 3, a gasket 62' is retained within the groove by angling the inner wall of each of the projections 66' towards the center of the groove. In this embodiment, the gasket 62' is preferably provided with a bevel cut so that the gasket 62' tapers away from the end cap 56'. The pliable gasket 62' is compressed and inserted into the groove, where the gasket 62' expands to meet the inner walls of the projections 66'. The gasket 62' is thus retained within the groove by frictional forces.

Figure 4:
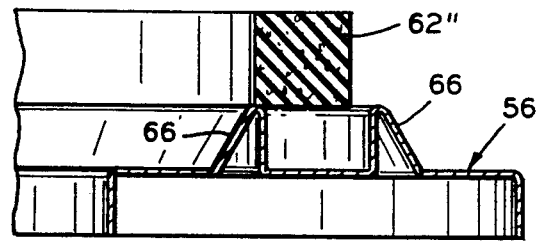
FIG. 4 is an enlarged sectional view of a second embodiment of the housing end cap and gasket.

In the alternate embodiment illustrated in FIG. 4, the gasket 62 is retained within the groove 64 by forming the gasket 62 so that its inner diameter is somewhat less than the inner diameter of the groove 64. The gasket 62 must be stretched outwardly to allow insertion of the same into the groove 64. The gasket 62 thus exerts a force on the inner wall of the inner projection 66, retaining the gasket 62 within the groove 64.

Figure 5:
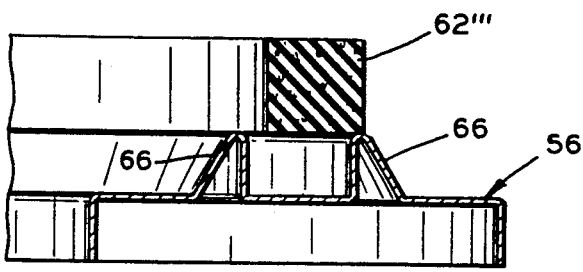
FIG. 5 is an enlarged sectional view of a third embodiment of the housing end cap and gasket.

Similarly, in a third embodiment illustrated in FIG. 5, the gasket 62 is retained within the groove 64 by forming the gasket 62 so that its outer diameter is somewhat greater than the outer diameter of the groove 64. The gasket 62 must be compressed inwardly to allow insertion of the same into the groove 64. The gasket 62 exerts a force on the inner wall of the outer projection 66, retaining the gasket 62 within the groove 64.

Figure 6:
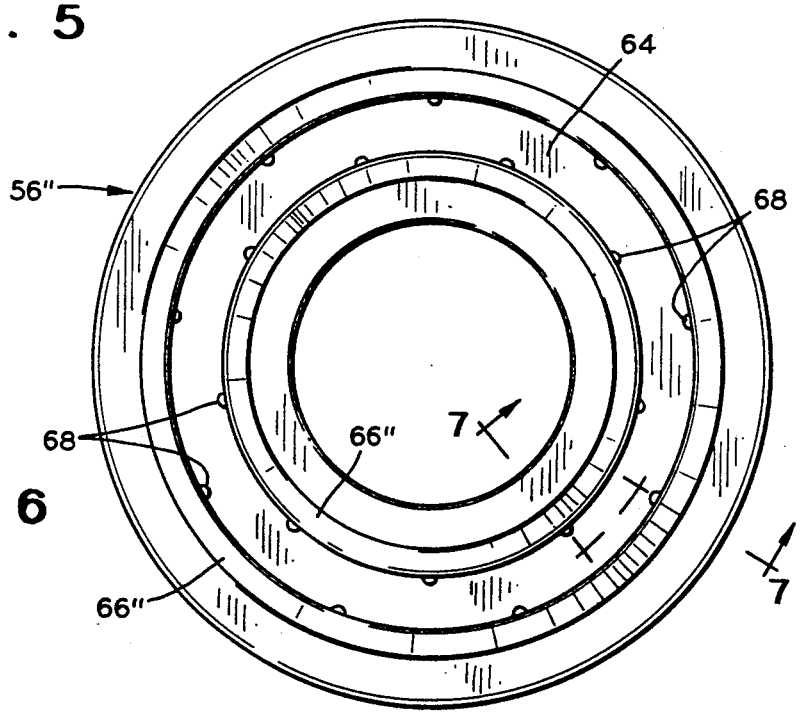
FIG. 6 is an end view of a fourth embodiment of the housing end cap and gasket.
Figure 7:
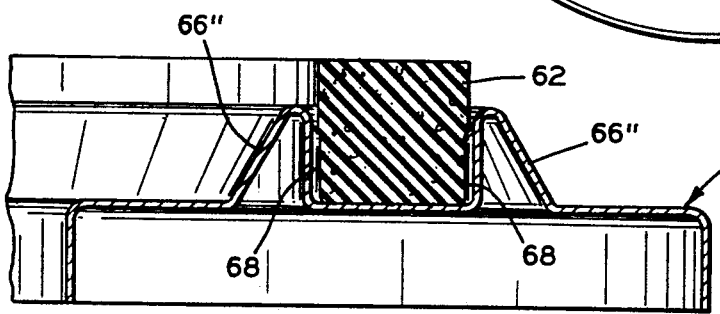
FIG. 7 is an enlarged sectional view taken along line 7—7 of FIG. 6.

In the most preferred embodiment, illustrated in FIGS. 6 and 7, the groove is provided with a plurality of alternating inwardly-projecting indentations 68 formed on the opposing inner walls of the projections 66" forming the groove. The plurality of indentations 68 frictionally retains the gasket 62 within the groove. The indentations 68 also facilitate insertion of the gasket 62 into the groove by allowing the air beneath the gasket 62 to escape as the gasket 62 is inserted into the groove. The indentations 68 are preferably struck from the side walls of the projections 66".

In accordance with the provisions of the patent statutes, the present invention has been described in what is considered to represent its preferred embodiment.

However, it should be noted that the invention can be practiced otherwise than as specifically illustrated and described without departing from its spirit or scope.

What is claimed is:

1. An air filter assembly, comprising:
   a filter housing having opposing end walls and a side wall between the end walls, said housing having an air inlet and an air outlet formed therein;
   a filter media mounted within said housing and interposed between the inlet and outlet of said housing;
   a metal end cap secured to one end of said filter media, said end cap having a pair of radially spaced annular projections extending from said end cap to form an annular groove in said metal end cap, each of said projections being comprised of a pair of opposed sidewalls interconnected at the distal ends thereof;
   a gasket disposed within said groove, said gasket being formed of a pliable material; and
   means for urging said end cap against an adjacent end wall of said housing to compress said gasket therebetween, thereby sealing said inlet from said outlet and insuring that air passing through said outlet must first pass through said filter media.

2. An air filter assembly as defined in claim 1, wherein said gasket is formed of foamed rubber.

3. An air filter assembly as defined in claim 1, wherein each of said projections is comprised of a pair of opposed sidewalls stamped from said metal end cap.

4. An air filter assembly as defined in claim 1, wherein each of said projections is formed of an inner sidewall adjacent said groove and an associated outer sidewall spaced radially therefrom, both of said outer sidewalls being angularly disposed with respect to the inner sidewall associated therewith.

5. An air filter assembly as defined in claim 1, further comprising means for retaining said gasket within said groove.

6. An air filter assembly as defined in claim 5, wherein said means for retaining said gasket within said groove comprises a plurality of alternating inwardly-projecting indentations provided on the opposing inner walls of the groove.

7. An air filter assembly as defined in claim 1, wherein the inner diameter of said gasket is less than the inner diameter of said groove.

8. An air filter assembly as defined in claim 1, wherein the outer diameter of said gasket is greater than the outer diameter of said groove.

9. An air filter assembly as defined in claim 1, wherein the inner walls defining said groove are angled inwardly toward the center of said groove.

10. An air filter assembly as defined in claim 9, wherein the opposing side walls of said gasket are provided with a bevel cut so that the gasket tapers inwardly away from said end cap.

11. An air filter assembly, comprising:
    a filter housing having opposing end walls and a side wall between the end walls, said housing having an air inlet and an air outlet formed therein;
    a filter media mounted within said housing and interposed between the inlet and outlet of said housing;
    an end cap secured to one end of said filter media, said end cap having a groove formed therein by a pair of radially spaced annular projections extending from said end cap, each of said projections being comprised of a pair of opposed sidewalls stamped from said metal end cap;
    a pliable, foamed rubber gasket disposed within said groove; and
    means for urging said end cap against an adjacent end wall of said housing to compress said gasket therebetween, thereby sealing said inlet from said outlet so that no air can pass out of said outlet without having first passed through said filter media.

12. An air filter assembly as defined in claim 11, wherein said groove is provided with of a plurality of alternating inwardly-projecting indentations provided on the opposing inner walls of the groove for retaining said gasket within said groove.

13. An air filter assembly as defined in claim 11, wherein the inner diameter of said gasket is smaller than the inner diameter of said groove.

14. An air filter assembly as defined in claim 11, wherein the outer diameter of said gasket is larger than the outer diameter of said groove.

15. An air filter assembly as defined in claim 11, wherein the opposing inner walls of said annular projections are angled inwardly toward the center of said groove.

16. An air filter assembly as defined in claim 15, wherein said gasket is provided with a bevel cut so that the gasket tapers away from said end cap.

17. An air filter assembly as defined in claim 11, wherein each of said projections is formed of an inner sidewall adjacent said groove and an associated outer sidewall spaced radially therefrom, both of said outer sidewalls being angularly disposed with respect to the inner sidewall associated therewith.

* * * * *